United States Patent Office 2,845,824
Patented Aug. 5, 1958

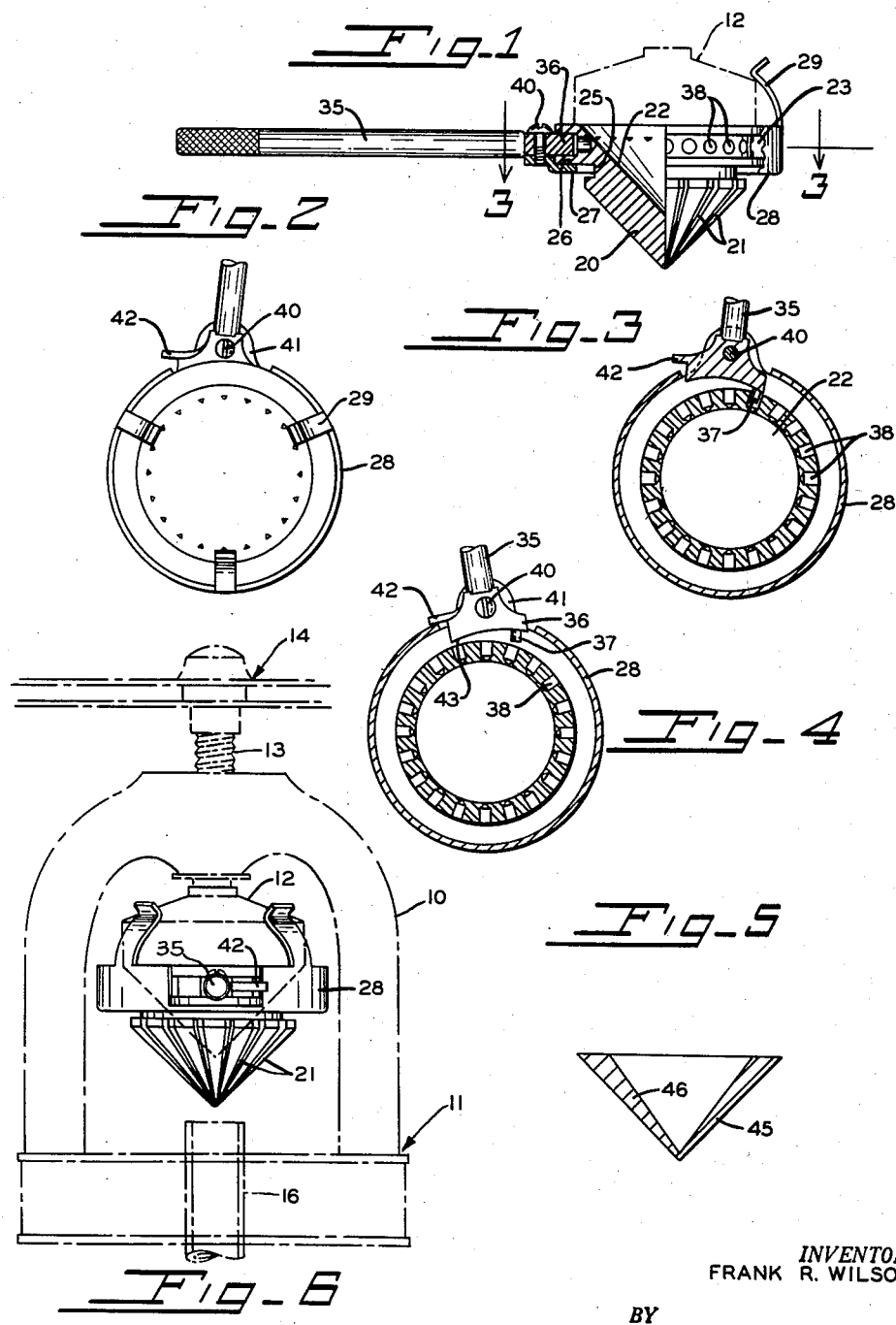

2,845,824

TUBE REAMING TOOL

Frank R. Wilson, Memphis, Tenn.

Application January 5, 1954, Serial No. 402,301

3 Claims. (Cl. 77—73)

This invention relates to tube working tools and, more particularly, to a reaming tool for removing burrs from the ends of tubes which are being prepared either for installation on a particular job or for further tube working operations.

When a piece of tubing is cut by a tube cutter or saw, a burr is left on the inside of the end of the tube. It is usually desirable, and often times necessary, to remove this burr before proceeding further with the preparation of the tube for installation. It is the purpose of the present invention to provide a reaming tool of unique design for facilitating the removal of burrs from the ends of tubes. As will shortly appear, my tool is designed for use with a tube flaring tool, the reamer element being adapted to fit over the cone of the flaring tool so that the cone advancing mechanism of the flaring tool may be utilized for forcing the reamer into the end of the tube to be reamed out. The tube may be held in the conventional clamping die of the flaring tool during this operation thereby further simplifying the use of the reamer. By thus utilizing the cone advancing mechanism and the tube clamping device of a tube flaring tool, I am able to provide a very simple but effective tube reaming tool.

Accordingly, it is an object of this invention to provide a tube reaming tool having a conical reamer which is adapted to fit over the cone of a tube flaring tool.

Another object of the invention is to provide means for holding the reamer in place on the cone of the tube flaring tool while permitting it to rotate relative to the cone.

Another object of the invention is to provide a novel, unidirectional driving mechanism for the reamer.

Another object of the invention is to provide an adapter having conical internal and external surfaces for adapting a flaring cone of one apex angle to fit a reamer of a different apex angle.

With these and other objects in view which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

Fig. 1 is a side elevation, partly in cross-section, showing my reaming tool with the conical reamer thereof fitted on the cone of a tube flaring tool.

Fig. 2 is a top plan view of the reaming tool shown in Fig. 1.

Fig. 3 is a cross-sectional view taken along the line 3—3 in Fig. 1.

Fig. 4 is a cross-sectional view similar to Fig. 3 but showing the operating handle in a different position.

Fig. 5 is a cross-sectional view of an adapter used to fit a reamer of one apex angle to a flaring cone of a different apex angle.

Fig. 6 is a side elevation showing the reaming tool fitted on the cone of a tube flaring tool.

As mentioned earlier, my novel form of reaming tool is adapted for use in connection with tube flaring tools of conventional construction. In Fig. 6 of the drawings I have shown it applied to such a flaring tool. This tool includes a yoke 10, a tube clamping device 11 secured to the lower ends of the legs of the yoke 10, and a flaring cone 12 mounted on the lower end of a threaded spindle 13 which screws into a threaded hole provided in the neck of the yoke 10. The spindle is provided at its upper end with a handle 14 by which it may be rotated to feed the cone into the end of a tube 16 held in the clamping device 11.

As best shown in Fig. 1, my improved form of reaming tool includes a conical reamer 20 provided on its outer surface with a series of cutting teeth 21 which converge toward a point at the apex of the reamer. The reamer 20 is formed with a conical recess 22 which is adapted to receive and mate with the conical point of the flaring cone 12. An annular groove 23 is formed in the upper end of the reamer, the latter being undercut beneath the groove so as to provide a radial shoulder 26. This shoulder is engaged by a circular flange 27 formed on a cup 28 which is adapted to be removably attached to the flaring cone 12 by three spring clips 29 which extend upwardly and inwardly from the upper edge of the cup.

Means is provided for turning the reamer in a clockwise direction as viewed from above (see Fig. 3) so as to cause the cutting teeth 21 to remove any burr present on the inside of the tube. This means includes an operating handle 35 which is provided at its inner end with a flattened and enlarged head 36 which carries a projecting lug or dog 37 adapted to engage with one of a series of depressions or teeth 38 provided around the periphery of the reamer in the bottom of the groove 23. The sidewall of the cup is cut away to permit the head 36 to enter into the annular groove 23 as shown in Fig. 1. The handle 35 is mounted for pivotal movement on the cup 28 by a pivot screw 40 which passes through a hole provided in the head 36 and screws into a threaded hole provided in an extension, or lip 41, struck off from the cup 28. Inasmuch as the handle is fastened to the cup 28 by screw 40, and the head 36 enters into the groove 23 provided in the reamer 20, the reamer is held in place within the cup 28 and cannot become accidentally dislodged therefrom when the reaming tool is not in place on the flaring cone 12.

On the side of the head 36 opposite the dog 37 is a shoulder or lug 42 which, as shown in Fig. 4, is adapted to engage with the adjoining edge of the cup 28 when the handle is turned backward, or counterclockwise, about the pivot screw 40. This is for the purpose of maintaining a slight clearance between the heel 43 of the head 36 and the bottom of the annular groove 23 when the handle is turned backwards.

The operation of the reamer is as follows:

The reaming tool is attached to the flaring cone by pressing it upwardly against the bottom of the cone until the spring clips 29 snap over the upper face of the cone as shown in Fig. 1. The cone and reamer are then advanced downwardly into the end of the piece of tubing 16 held in the clamping means 11 of the flaring tool by rotating the handle 14. After the reamer has engaged the end of the tube, the operating handle 35 of the reaming tool is oscillated back and forth clockwise and counterclockwise, i. e., forward and backward, to cause intermittent clockwise turning movement of the reamer 20. This movement will result from engagement of the dog 37 with one of the notches or teeth 38 when the handle is moved forward thereby causing clockwise turning movement of the reamer 20 and cup 28. When the handle 35 is moved backward, it pivots on the screw 40 until the lug 42 strikes against the edge of the cup 28 at which time the end of the dog 37 will be removed from the notches 24 as shown in Fig. 4. The handle and cup are now free to move independently of the reamer and, due to the large amount of friction between the teeth 21 and the end of the tube 16, the reamer will remain at rest while the handle and cup are moved backward. When the handle is again moved forward, the dog 37 will enter into a depression 38 and again drive the reamer and cup 28 in a clockwise direction. The forward and backward oscillation of the handle 35 thereby provides intermittent clockwise turning movement of the reamer and causes the end of the tube to be reamed out as the reamer is fed down into the tube by turning of the handle 14 of the flaring tool.

In Fig. 5 I have shown an adapter 45 which is provided with conical interior and exterior surfaces. Inasmuch as there are both 45° and 37½° flaring cones on the market at the present time, I propose to make the adapter 45 available to users of my improved form of reaming tool so that it may be used with either type of flaring cone. For example, if the reamer 20 is provided with a conical recess 22 having an apex angle of 90°, then the external conical surface of the adapter 45 should be formed with an apex angle of 90° while the internal conical surface 46, thereof, should be provided with an apex angle of 75°. By dropping the adapter 45 into the recess of the reamer 20, it may thereby be adapted for use with a flaring cone of the 37½° type.

Having thus described my invention, what I claim as new and useful and desire to secure by United States Letters Patent, is:

1. An adapter for a flaring cone of a tube flaring tool for removing burrs from the ends of tubing comprising a body portion having a conical reamer at one end thereof, a wall defining a conical recess at the other end of the body portion adapted to receive and to engage the flaring cone, means including an annular flange portion rotatably supporting said body portion for at least partial rotation relative thereto and adapted for removably attaching said body portion to the flaring cone, and means for rotating the body portion as it is forced into the end of a tube by the flaring cone.

2. An adapter for a flaring cone of a tube flaring tool for removing burrs from the ends of tubing comprising a body portion having a conical reamer at one end thereof, a wall defining a conical recess at the other end of the body portion adapted to receive and to engage the flaring cone, means including an annular flange portion having spring clips attached thereto and rotatably supporting said body portion for at least partial rotation relative and adapter for removably attaching said body portion to the flaring cone, and means for rotating the body portion as it is forced into the end of a tube by the flaring cone.

3. An adapter for a flaring cone of a tube flaring tool for removing burrs from the ends of tubing comprising a body portion having a conical reamer at one end thereof, a wall defining a conical recess at the other end of the body portion adapted to receive and to engage the flaring cone, a shoulder on said body portion, a cup member disposed about the body portion and having a flange to engage said shoulder and rotatably support the body portion, fastening means on the cup member adapted to removably attach it to the flaring cone of the flaring tool, and turning means carried by the cup member to slide said shoulder relatively to the flange as the body portion is forced into the end of a tube by the flaring cone.

References Cited in the file of this patent

UNITED STATES PATENTS

| Number | Name | Date |
|---|---|---|
| 648,394 | Danley | May 1, 1900 |
| 994,581 | Fay | June 6, 1911 |
| 1,420,915 | Dexter et al. | June 27, 1922 |
| 1,462,293 | Mason | July 17, 1923 |
| 1,681,087 | Becker | Aug. 14, 1928 |
| 2,351,578 | Bauer | June 20, 1944 |
| 2,397,371 | Reynolds | Mar. 26, 1946 |
| 2,552,998 | Norton | May 15, 1951 |